United States Patent
Kim et al.

(10) Patent No.: US 8,111,661 B2
(45) Date of Patent: Feb. 7, 2012

(54) METHOD AND APPARATUS FOR IMPLEMENTING CLEAR CHANNEL ASSESSMENT FUNCTION IN MULTI-BAND OFDM SYSTEM

(75) Inventors: Yun Young Kim, Yongin-si (KR); Jae Ho Roh, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 687 days.

(21) Appl. No.: 11/702,158

(22) Filed: Feb. 5, 2007

(65) Prior Publication Data

US 2008/0089222 A1    Apr. 17, 2008

(30) Foreign Application Priority Data

Oct. 13, 2006  (KR) .................. 10-2006-0099821

(51) Int. Cl.
*H04W 4/00* (2009.01)
(52) U.S. Cl. ............... 370/330; 370/319; 370/344
(58) Field of Classification Search ............... 455/423, 455/405; 370/338, 319, 373, 203, 208, 243, 370/344, 445, 322, 324, 330, 343, 348, 350, 370/436

See application file for complete search history.

(56) References Cited

U.S. PATENT DOCUMENTS

| | | | |
|---|---|---|---|
| 7,245,893 B1 * | 7/2007 | Husted et al. ............. | 455/226.3 |
| 2003/0091066 A1 | 5/2003 | Choi et al. | |
| 2004/0028003 A1 * | 2/2004 | Diener et al. ............. | 370/319 |
| 2004/0116112 A1 * | 6/2004 | Gray ............................ | 455/423 |
| 2008/0192810 A1 * | 8/2008 | Razzell et al. ............. | 375/150 |

FOREIGN PATENT DOCUMENTS

| | | |
|---|---|---|
| EP | 1411675 A1 | 4/2004 |
| KR | 10-2004-0050813 A | 6/2004 |
| KR | 10-2005-0071488 A | 7/2005 |
| KR | 10-2005-0100951 A | 10/2005 |
| WO | 02071627 A2 | 9/2002 |
| WO | 2006/014342 A2 | 2/2006 |
| WO | 2006021937 A2 | 3/2006 |

OTHER PUBLICATIONS

Japanese Office Action dated Oct. 13, 2009 (Japanese Application No. 2007-84879).

\* cited by examiner

*Primary Examiner* — Kent Chang
*Assistant Examiner* — San Htun
(74) *Attorney, Agent, or Firm* — Sughrue Mion, PLLC

(57) ABSTRACT

A clear channel assessment CCA method implemented in a multi-band orthogonal frequency division multiplexing (OFDM) system, the method including: estimating an energy of a received signal in each window at predetermined intervals of two moving-average windows; detecting a peak value according to a difference of energies estimated in relation to the two moving-average windows, and accumulating a number of detected peak values; and reporting a channel status to a medium access control (MAC) according to the number of the accumulated peak values.

20 Claims, 12 Drawing Sheets

METHOD AND APPARATUS FOR IMPLEMENTING CLEAR CHANNEL ASSESSMENT FUNCTION IN MULTI-BAND OFDM SYSTEM

CROSS-REFERENCE TO RELATED APPLICATION

This application claims priority from Korean Patent Application No. 10-2006-0099821, filed on Oct. 13, 2006, in the Korean Intellectual Property Office, the entire disclosure of which is incorporated herein by reference.

BACKGROUND OF THE INVENTION

1. Field of the Invention

Methods and apparatuses consistent with the present invention relate to a multi-band orthogonal frequency division multiplexing (OFDM). More particularly, the present invention relates to a method of implementing a clear channel assessment (CCA) function in a multi-band OFDM system of providing a relatively accurate CCA performance, and an apparatus for performing the method.

2. Description of Related Art

A multi-band orthogonal frequency division multiplexing (OFDM) generally relates to a method of an OFDM symbol hopping between frequencies among a plurality of frequency bands every predetermined symbol unit and transmitting a signal, and more particularly, to a modulation technology used for a particular wireless communication system such as an ultra wideband (UWB) system. The multi-band OFDM system may transmit and receive a large amount of data every unit hour by transmitting data using the plurality of frequency bands having a regular frequency band.

The multi-band OFDM system provides a clear channel assessment (CCA) function of detecting whether a frequency band intended to be used is currently used by another device, and may be mainly divided into a cross correlation method or an energy detection method. Since the cross correlation method is excellent in a performance aspect regardless of channel, and may be simply applied to a preamble, it is difficult to detect a signal for a period of time of 4.6875 μs corresponding to a predetermined interval of 15 OFDM symbols when considering a random point in time of detecting the CCA.

However, since the energy detection method corresponds to a method of estimating an energy of a received signal, and comparing an amount of the energy of the received signal with a specific critical value, there is an advantage that the method may be simply applied regardless of whether the received signal corresponds to a preamble or a payload. Efforts for correctly determining a channel status by using the energy detection method having the advantage are currently underway.

Therefore, a method of implementing a clear channel assessment (CCA) function in a multi-band OFDM system of providing a relatively accurate CCA performance, and an apparatus for performing the method is needed.

SUMMARY OF THE INVENTION

The present invention provides a method of implementing a clear channel assessment (CCA) function in a multi-band orthogonal frequency division multiplexing (OFDM) system capable of respectively estimating an energy of a received signal using at least two moving-average windows established according to a time frequency code (TFC), and detecting a peak value according to a difference of the estimated energies in order to correctly establish a channel status regardless of channel environment according to detected peak values, and an apparatus for performing the method.

According to an aspect of the present invention, there is provided a CCA method implemented in an OFDM system, the method including: estimating an energy of a received signal in each window at predetermined intervals of two moving-average windows; detecting a peak value according to a difference of energies estimated in relation to the two moving-average windows, and accumulating a number of detected peak values; and reporting a channel status to a medium access control (MAC) according to the number of the accumulated peak values.

According to another aspect of the present invention, there is provided a CCA apparatus in an OFDM system including: an estimating unit for estimating an energy of a received signal in each window at predetermined intervals of two moving-average windows; a detecting unit for detecting a peak value according to a difference of energies estimated in relation to the two moving-average windows, and accumulating a number of detected peak values; and a reporting unit for reporting a channel status to a MAC according to the number of the accumulated peak values.

BRIEF DESCRIPTION OF THE DRAWINGS

The above and other aspects of the present invention will become apparent and more readily appreciated from the following detailed description of certain exemplary embodiments of the invention, taken in conjunction with the accompanying drawings of which.

DETAILED DESCRIPTION OF EXEMPLARY EMBODIMENTS OF THE INVENTION

Figure 1:
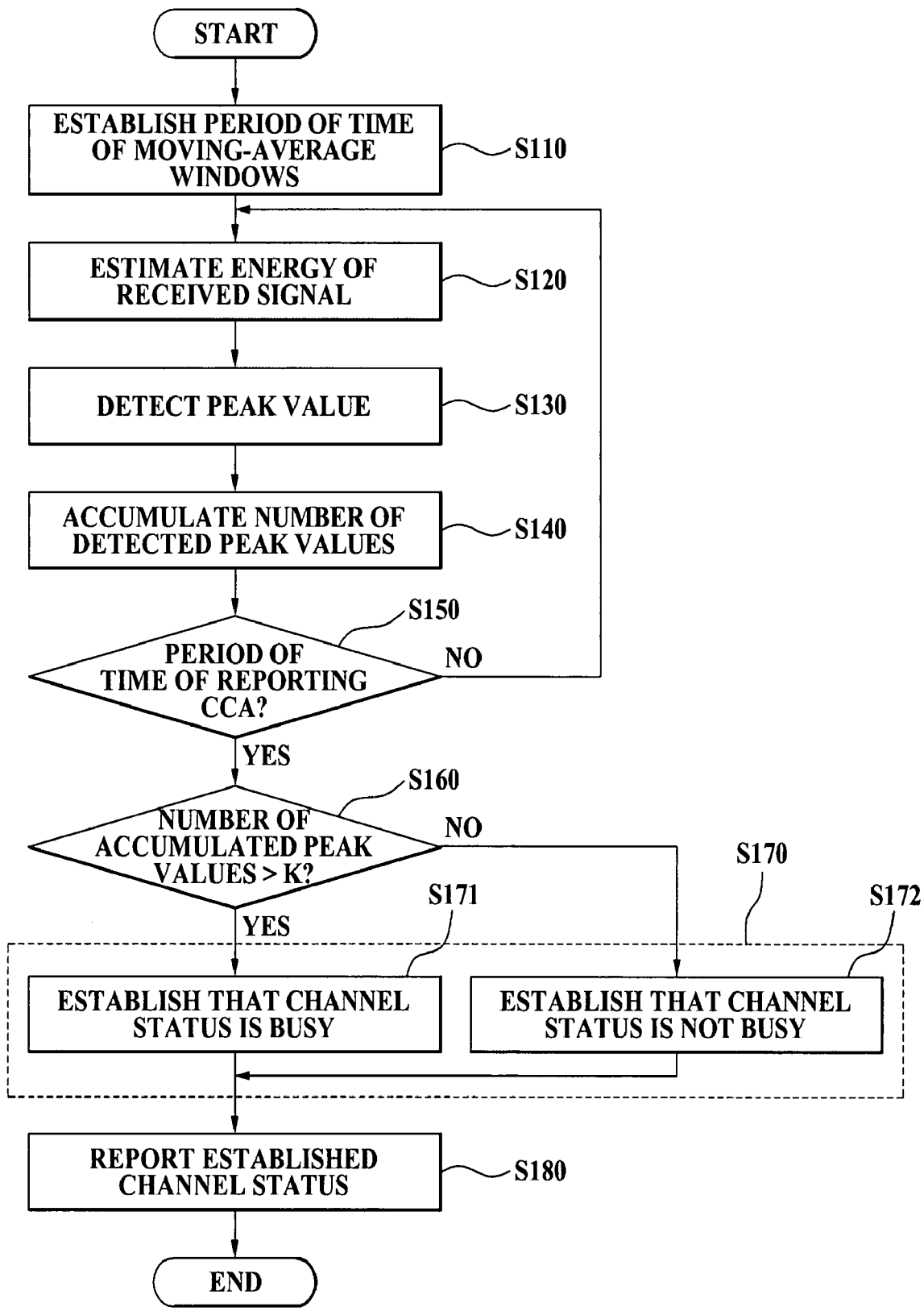
FIG. 1 is a flowchart illustrating a method of providing a clear channel assessment (CCA) function according to an exemplary embodiment of the present invention.

Reference will now be made in detail to exemplary embodiments of the present invention, examples of which are illustrated in the accompanying drawings, wherein like reference numerals refer to the like elements throughout. The exemplary embodiments are described below in order to explain the present invention by referring to the figures.

FIG. 1 is a flowchart illustrating a method of providing a clear channel assessment (CCA) function according to an exemplary embodiment of the present invention.

As illustrated in, FIG. 1, the method of providing the CCA function according to the exemplary embodiment of the present invention may include establishing a period of time of moving-average windows (S110), estimating an energy of a received signal (S120), detecting a peak value (S130), accumulating a number of detected peak values (S140), determining a period of time of reporting CCA (S150), comparing the number of the accumulated peak values with a critical value previously established (S160), establishing a channel status (S170), and reporting an established channel status (S180). Here, the CCA function may be applied to a multi-band orthogonal frequency division multiplexing (OFDM) system.

Similar to the description above, the method of providing the CCA function according to the exemplary embodiment of the present invention is described in detail, as follows.

First, a period of time of two moving-average windows is established according to a time frequency code (TFC) (S110). Each of the moving-average windows has an identical period of time, and the period of time may vary according to a modification of the TFC.

An energy of a received signal is estimated in each window in the predetermined intervals of the established two moving-average windows (S120). For each of the two moving-average windows, energy of the received signal may be estimated from one frequency band of a plurality of frequency bands.

A peak value is detected according to estimated energies (S130), and a number of detected peak values is accumulated, i.e., counted (S140). Specifically, the peak values may be detected for a period of time of estimating the CCA.

Similar to the description above, at least two moving-average windows set according to the TFC are used, and a principle of detecting a peak value when a frequency hops every one OFDM symbol unit is described with reference to FIGS. 2 through 4 where a starting point of the period of time of detecting the CCA varies.

Figure 2:
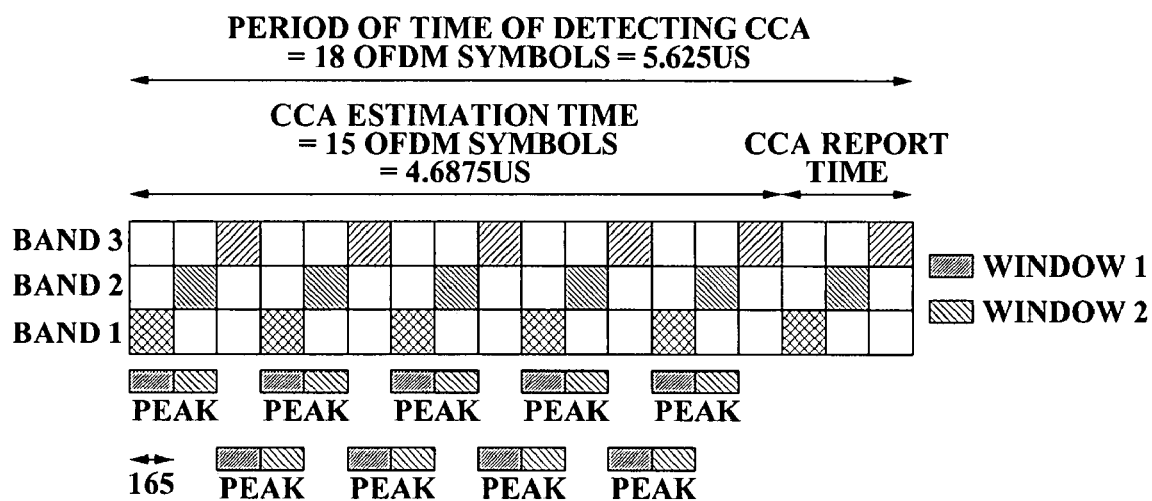
FIG. 2 is a first diagram illustrating a principle of detecting a peak value according to an exemplary embodiment of the present invention.
Figure 3:
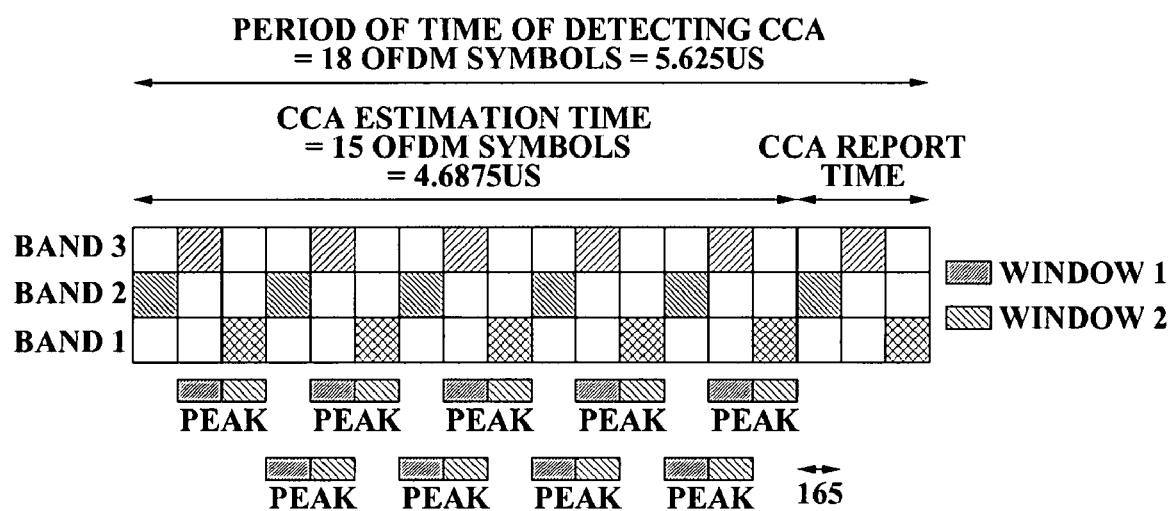
FIG. 3 is a second diagram illustrating a principle of detecting a peak value according to an exemplary embodiment of the present invention.
Figure 4:
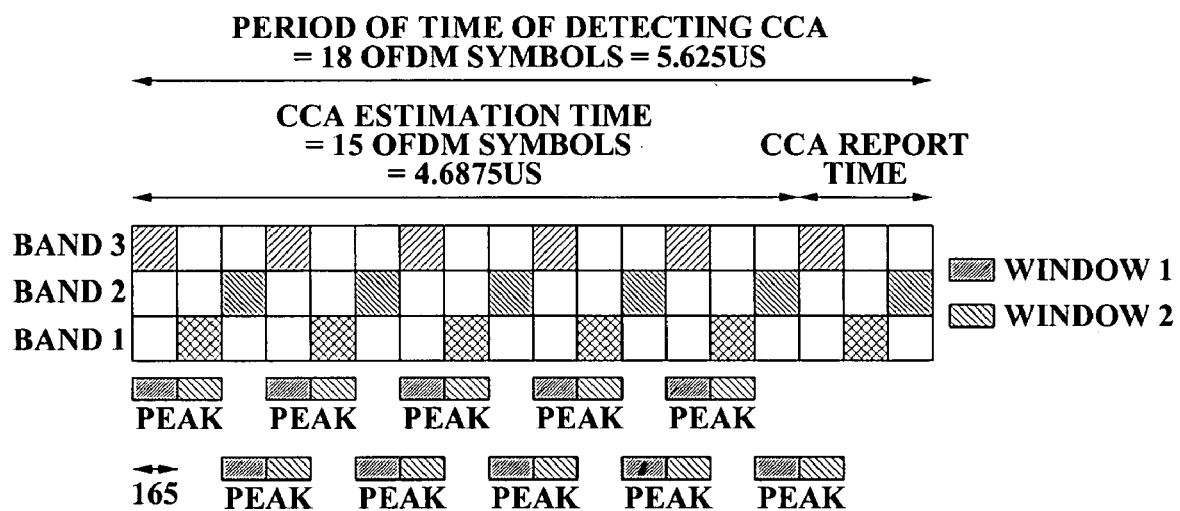
FIG. 4 is a third diagram illustrating a principle of detecting a peak value according to an exemplary embodiment of the present invention.
Figure 5:
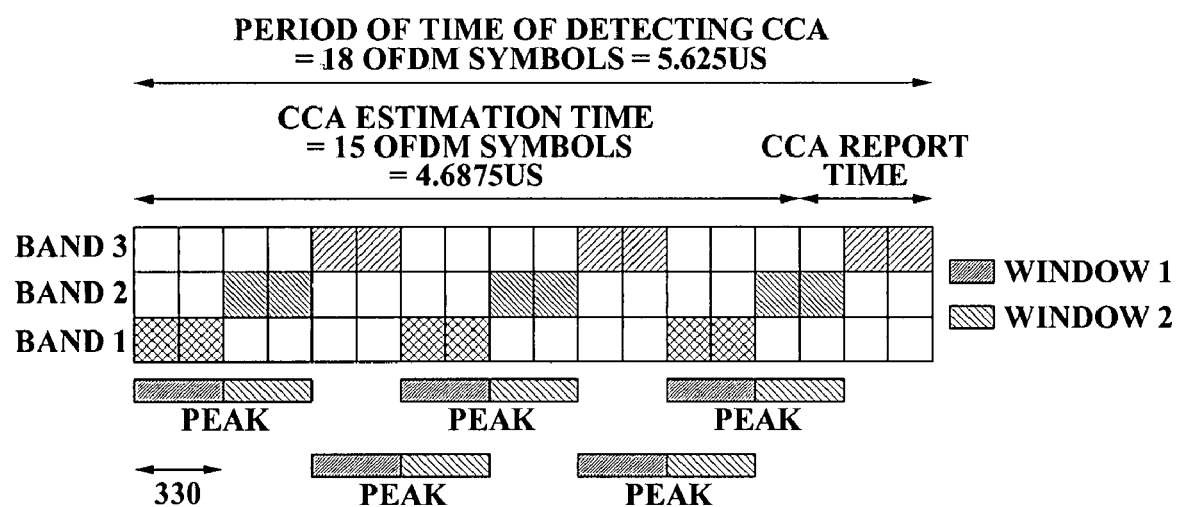
FIG. 5 is a fourth diagram illustrating a principle of detecting a peak value according to an exemplary embodiment of the present invention.
Figure 6:
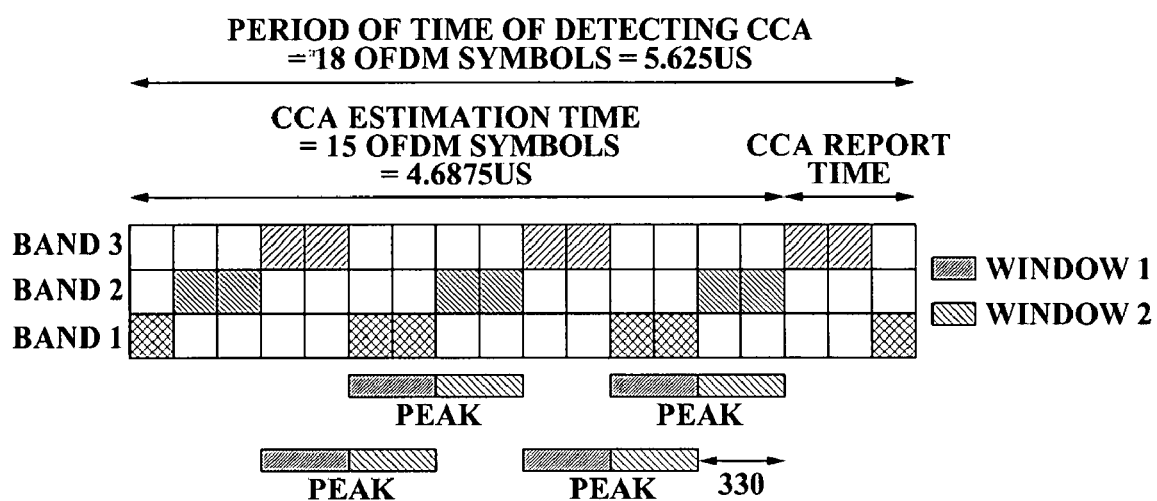
FIG. 6 is a fifth diagram illustrating a principle of detecting a peak value according to an exemplary embodiment of the present invention.
Figure 7:
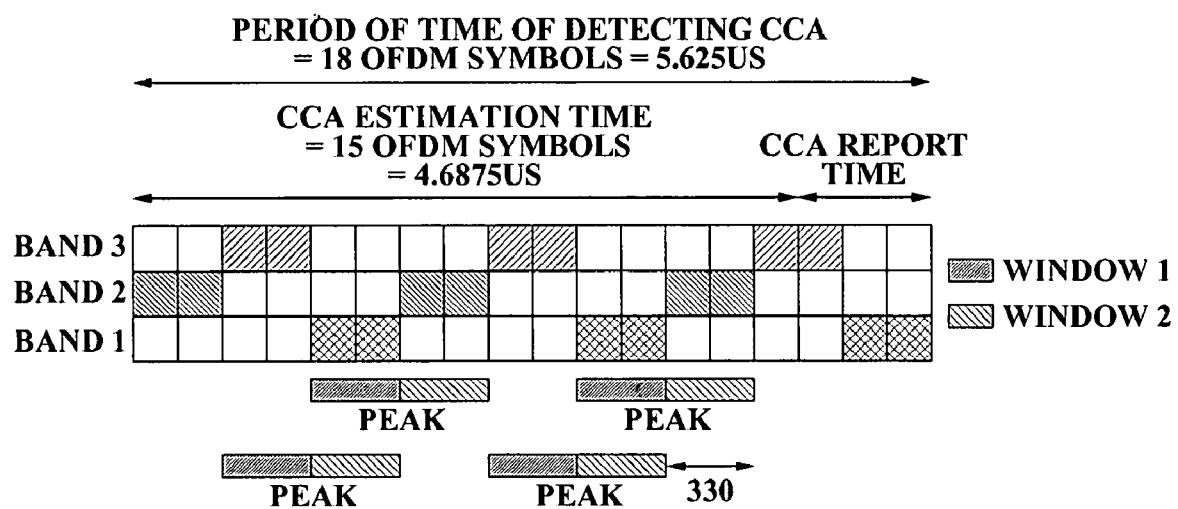
FIG. 7 is a sixth diagram illustrating a principle of detecting a peak value according to an exemplary embodiment of the present invention.
Figure 8:
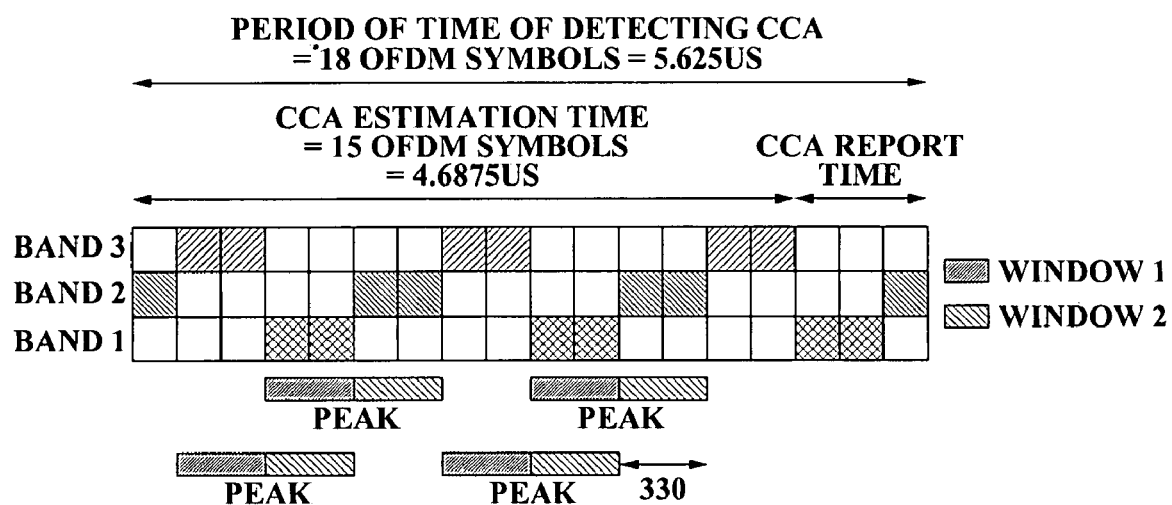
FIG. 8 is a seventh diagram illustrating a principle of detecting a peak value according to an exemplary embodiment of the present invention.
Figure 9:
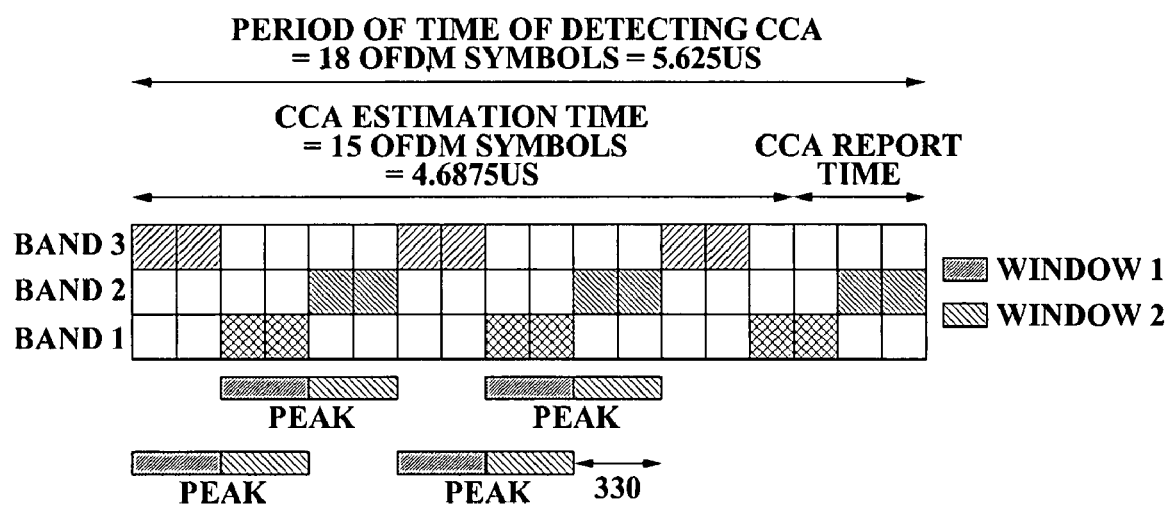
FIG. 9 is an eighth diagram illustrating a principle of detecting a peak value according to an exemplary embodiment of the present invention.
Figure 10:
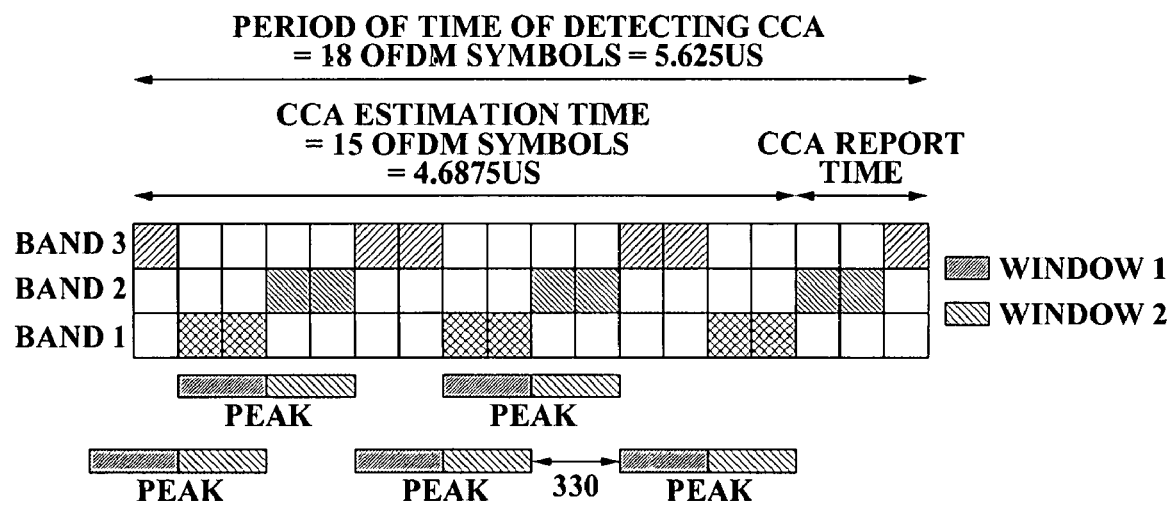
FIG. 10 is a ninth diagram illustrating a principle of detecting a peak value according to an exemplary embodiment of the present invention.

FIGS. 2 through 4 are exemplary diagrams illustrating a principle of detecting a peak value when a frequency hops every one OFDM symbol unit according to an exemplary embodiment of the present invention.

As illustrated in FIGS. 2 through 4, when a frequency hops every one OFDM symbol unit, two moving-average windows are established, and an energy of a received signal may be estimated from any one frequency band, for example, a band 1 of a plurality of frequency bands such as a multi-band including a band 1, a band 2, and a band 3, by using the established two moving-average windows. The peak value may be detected according to the estimated energies, and as is obvious to those of ordinary skill in the art, the peak value is detected from a leading edge or a falling edge of every one OFDM symbol unit.

For example, the present invention has a period of time of detecting the CCA every 18 OFDM symbols, i.e., 5.625 µs, and may be generally divided into a period of time of estimating the CCA during 15 OFDM symbols, i.e., 4.6875 µs, and a period of time of reporting the CCA during three OFDM symbols. A period of time of one OFDM symbol unit, i.e., a period of time of each of the two moving-average windows, may correspond to a period of time of 165 samples. In this instance, when the energy of the received signal is estimated from the band 1, a large amount of energy is detected for a period of one OFDM symbol from predetermined intervals of three OFDM symbols by data transmitted for a period of time of one OFDM symbol every three OFDM symbols. Accordingly, the energies estimated in each of the two moving-average windows has a peak value in a leading edge or a falling edge of each OFDM symbol. Here, the peak value indicates a maximum of a value represented by the subtraction of a small amount of energy from a great amount of energy.

Also, when considering a case when a starting point in time of the received signal varies, as illustrated in FIGS. 2 through 4, the maximum number of the accumulated peak values during the period of time of estimating the CCA, may vary. Specifically, nine peak values may be detected in FIGS. 2 and 3, and ten peak values may be detected in FIG. 4.

The method may correctly establish a channel status according to detected peak values for the period of time of estimating the CCA by detecting the peak values from a leading edge or a falling edge of every one OFDM symbol unit using the two moving-average windows.

Hereinafter, a principle of detecting the peak value when a frequency hops every two OFDM symbol units is described with reference to FIGS. 5 through 10 where a point in time of detecting the CCA varies.

FIGS. 5 through 10 are diagrams illustrating a principle of detecting the peak value when a frequency hops every two OFDM symbol units according to an exemplary embodiment of the present invention.

As illustrated in FIGS. 5 through 10, two moving-average windows are established, and an energy of a received signal may be estimated from any one frequency band, for example, a band 1 of a plurality of frequency bands such as a multi-band including a band 1, a band 2, and a band 3, by using the established two moving-average windows. The peak value may be detected according to the estimated energies, and as is obvious to those of ordinary skill in the art, the peak value is detected from a leading edge or a falling edge of every one OFDM symbol unit.

For example, since a frequency hops every two OFDM symbol units, the present invention may establish the two OFDM symbols units, i.e., two moving-average windows, and a period of time of each of the established two moving-average windows may correspond to a period of time of 330 samples. In this instance, when the energy of the received signal is estimated from the band 1, a large amount of energy is detected for a period of two OFDM symbols from predetermined intervals of six OFDM symbols by data transmitted for a period of time of two OFDM symbols every six OFDM symbols. Accordingly, the energies estimated in each of the two moving-average windows has a peak value in a leading edge or a falling edge of two respective OFDM symbols. Here, the peak value also indicates a maximum of a value represented by the subtraction of a small amount of energy from a great amount of energy.

Also, when considering that a starting point in time of detecting the CCA varies, the maximum number of the accumulated peak values during the period of time of estimating the CCA may vary. Specifically, five peak values may be detected in FIGS. 5 and 10, and four peak values may be detected in FIGS. 6 through 9.

Hereinafter, a principle of detecting the peak value when a frequency does not hop is described with reference to FIG. 11.

Figure 11:
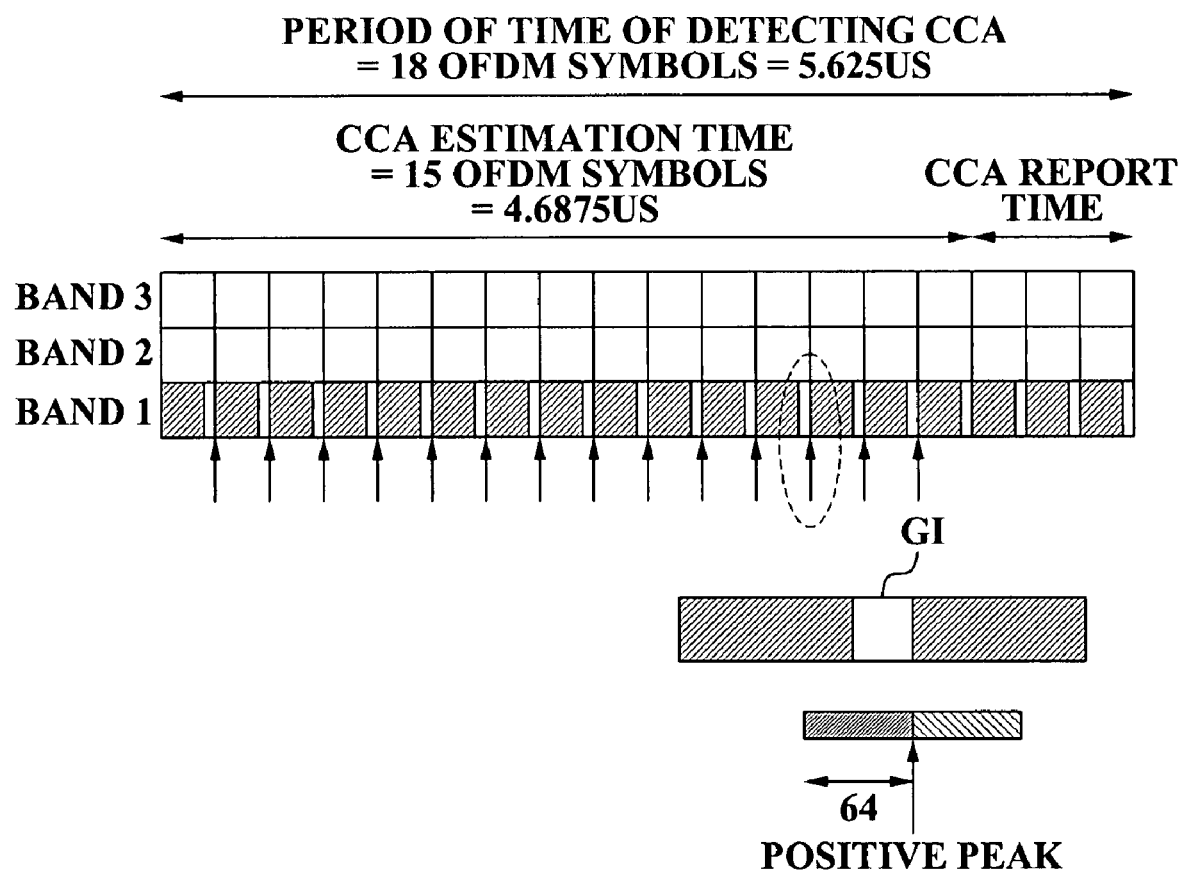
FIG. 11 is a tenth diagram illustrating a principle of detecting a peak value according to an exemplary embodiment of the present invention.

FIG. 11 is a tenth diagram illustrating a principle of detecting a peak value according to an exemplary embodiment of the present invention.

As illustrated in FIG. 11, when a frequency does not hop, two moving-average windows are established, and an energy of a received signal may be estimated by using the established two moving-average windows. The peak value may be detected according to the estimated energies, and as is obvious to those of ordinary skill in the art, the peak value is detected from a leading edge or a falling edge of every one OFDM symbol unit. Specifically, the peak value may be detected by using a guard interval (GI) existing every OFDM symbol unit, for example, a period of time of 32 samples.

For example, since a frequency does not hop every two OFDM symbol units, the current two moving-average windows may be established to have a previously established period of time, and since OFDM symbols are continuously generated, a period of time of the two moving-average windows may correspond to a period of time of 64 samples.

Also, in FIG. 2, it is determined whether a period of time of reporting CCA has started, after accumulating the number of the detected peak values (S150). Specifically, it may be determined that a period of time of estimating the CCA of 15 OFDM symbol units for detecting the peak value according to the exemplary embodiment of the present invention, i.e., 4.6875 µs, has passed.

The number of the accumulated peak values may be compared with a critical value previously established (S160), and a channel status may be established as a result of the comparing (S170). Specifically, it may be established that the channel status is busy, i.e., that the channel is currently used by another device, when the number of the accumulated peak values is greater than the critical value previously established (S171). Also, it may be established that the channel status is not busy i.e., that the channel is not currently used by another device when the number of the accumulated peak values is less than or equal to the critical value previously established (S172). Here, the critical value is less than a maximum number of a maximally accumulated peak value, and may vary according to a TFC.

Next, the established channel status may be reported to the MAC (S180). Specifically, when the number of the accumulated peak values is greater than the critical value previously established, a channel status (CCA_STATUS) value may be established as 1 to denote that the channel is used, and be reported to a MAC. Also, when the number of the accumulated peak values is less than or equal to the critical value previously established, a CCA_STATUS value may be established as 0 to denote that the channel is not used, and be reported to the MAC.

The present invention can provide a CCA function more accurately and stably by generating the greatest number of the peak values for a period of detecting the CCA established using the two moving-average windows. Hereinafter, an apparatus for providing a CCA function according to an exemplary embodiment of the present invention is described with reference to FIG. 12.

Figure 12:
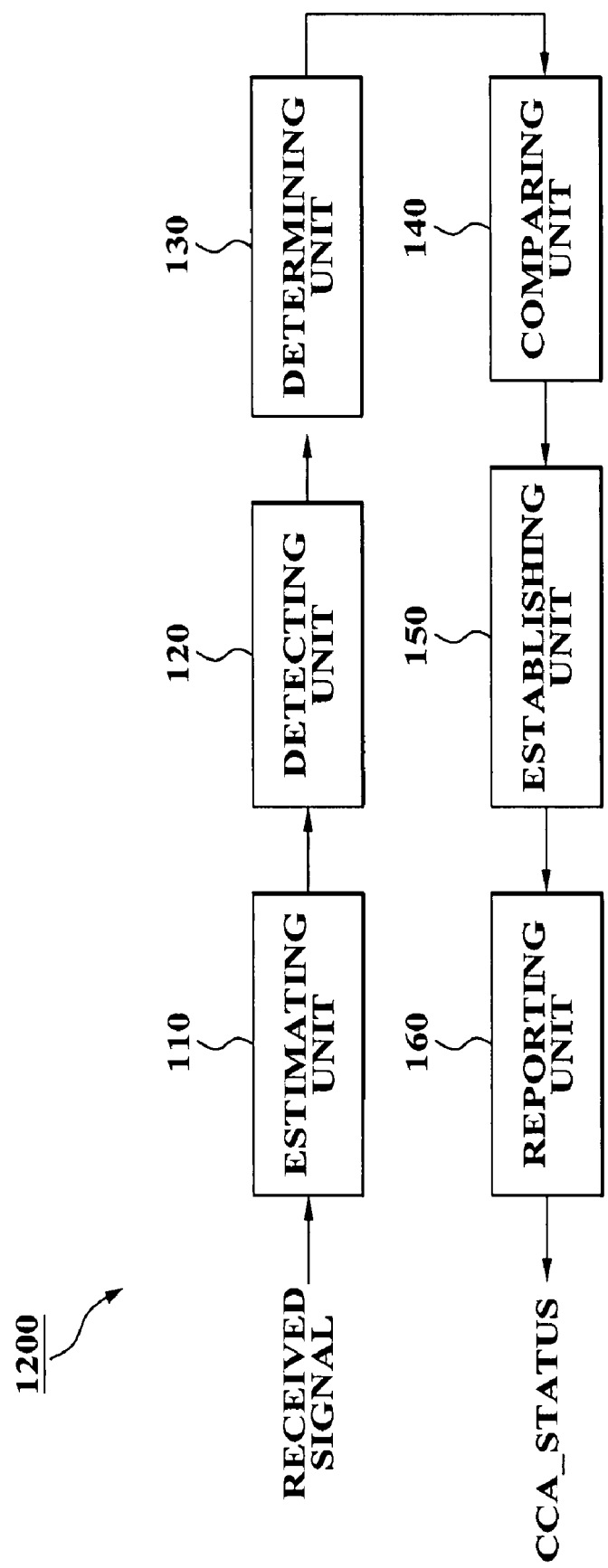
FIG. 12 is a configuration diagram illustrating an apparatus for providing a CCA function according to an exemplary embodiment of the present invention.

FIG. 12 is a configuration diagram illustrating a CCA apparatus 1200 according to an exemplary embodiment of the present invention.

As illustrated in FIG. 12, the CCA apparatus 1200 according to the exemplary embodiment of the present invention may include an estimating unit 110 for estimating an energy of a received signal, a detecting unit 120 for detecting a peak value, a determining unit 130 for determining a period of time of reporting CCA, a comparing unit 140 for comparing the number of the accumulated peak values with a critical value, an establishing unit 150 for establishing a channel status, and a reporting unit 160 for reporting an established channel status.

Similar to the description above, the apparatus for providing the CCA function according to the exemplary embodiment of the present invention is described in detail below.

First, at least two moving-average windows are established according to a TFC concerning an interval based on a number of symbols a frequency hops. The moving-average windows have an identical period of time to each other, and the period of time may vary according to the TFC.

The estimating unit 110 may estimate an energy of a received signal in each window by using the established two moving-average windows, and the detecting unit 120 may detect a peak value according to a difference of the estimated energies, and accumulates a number of detected peak values.

Here, the estimating unit 110 may estimate the energy of the received signal in each window by using the established moving-average windows, and estimate the energy of the received signal from any one frequency band of multi-bands.

The determining unit 130 may determine a period of time of reporting CCA after accumulating the number of the detected peak values, and the comparing unit 140 may compare the number of the accumulated peak values with a critical value (K) previously established, in a period of time of reporting the CCA.

The establishing unit 150 may establish whether a channel status is busy as a result of the comparing, and the reporting unit 160 may report the established channel status to the MAC. Specifically, the reporting unit 160 may report the CCA_STATUS value to the MAC by establishing the CCA_STATUS value as 1 to denote that the channel status is busy, i.e., that the channel is used by another device when the number of the accumulated peak values is greater than the critical value previously established.

Conversely, the reporting unit 160 may report the CCA_STATUS value to the MAC by establishing the CCA_STATUS value as 0 to denote that the channel status is not busy i.e., that the channel is not used by another device when the number of the accumulated peak values is less than or equal to the critical value previously established.

A method of implementing a CCA function in a multi-band OFDM system and an apparatus for performing the method according to the above-described embodiment of the present invention may be recorded in computer-readable media including program instructions to implement various operations embodied by a computer. The media may also include, alone or in combination with the program instructions, data files, data structures, and the like. The media and program instructions may be those specially designed and constructed for the purposes of the present invention, or they may be of the kind well-known and available to those having skill in the computer software arts. Examples of computer-readable media include magnetic media such as hard disks, floppy disks, and magnetic tape; optical media such as CD ROM disks and DVD; magneto-optical media such as optical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to, perform the operations of the above-described embodiments of the present invention.

Similar to the description above, a method of implementing a CCA function in a multi-band OFDM system, and an apparatus for performing the method according to an exemplary embodiment of the present invention have an effect that a channel status can be correctly established regardless of channel environment according to detected peak values, by estimating an energy of a received signal using at least two moving-average windows established according to a TFC, and detecting a peak value according to a difference of the estimated energies.

Although a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

What is claimed is:

1. A clear channel assessment (CCA) method implemented in an orthogonal frequency division multiplexing (OFDM) system, the method comprising:
   estimating first energy of a received signal in a first window of a predetermined interval of two moving-average windows and estimating a second energy in a second window of the two moving-average windows;
   detecting a peak value according to a difference of the first and the second energies, and counting a number of detected peak values;
   reporting a channel status to a medium access control (MAC) according to the number of the counted peak values;
   determining whether a period of time of reporting CCA has started, after counting the number of the detected peak values;
   comparing the number of the counted peak values with a predetermined critical value if the period of time of reporting the CCA has started; and
   establishing the channel status according to a result of the comparing,
   wherein the period of time of reporting the CCA repeats every 18 OFDM symbols, and corresponds to a period of time of at least one OFDM symbol for reporting the channel status to the MAC.

2. The method of claim 1, wherein each of the two moving-average windows has an identical period of time, and the period of time is established according to a time frequency code (TFC).

3. The method of claim 1, wherein the OFDM system corresponds to a multi-band OFDM system using a multi-band including three frequency bands for each channel.

4. The method of claim 1, wherein the OFDM system frequency hops every at least one OFDM symbol unit among a plurality of frequency bands.

5. The method of claim 1, wherein the predetermined critical value is less than a maximum of the number of counted peak values, and is established according to a time frequency code (TFC).

6. The method of claim 1, wherein the reporting comprises reporting, to the MAC, that the channel status is busy if the number of the counted peak values is greater than the predetermined critical value.

7. The method of claim 1, wherein the reporting comprises reporting, to the MAC, that the channel status is not busy if the number of the counted peak values is less than or equal to the predetermined critical value.

8. The method of claim 1, wherein the two moving-average windows are applied to any one of a plurality of frequency bands if the plurality of frequency bands is used for each channel.

9. The method of claim 1, wherein a period of time of each of the moving-average windows is equivalent to a period of time of at least one OFDM symbol unit for frequency hopping if a plurality of frequency bands is used for each channel.

10. The method of claim 1, wherein a period of time of the moving-average windows is equivalent to a period of time of 64 sample units if a single frequency band is used for each channel.

11. A non-transitory computer-readable recording medium storing a program for implementing the method according to claim 1.

12. A clear channel assessment (CCA) apparatus in an orthogonal frequency division multiplexing (OFDM) system comprising:
   an estimating unit which estimates a first energy of a received signal in a first window of a predetermined interval of two moving-average windows and estimates a second energy in a second window of the two moving-average windows;
   a detecting unit which detects a peak value according to a difference of the first and the second energies, and counting a number of detected peak values;
   a reporting unit which reports a channel status to a medium access control (MAC) according to the number of the counted peak values;
   a determining unit which determines whether a period of time of reporting CCA has started, after counting the number of the detected peak values;
   a comparing unit which compares the number of the counted peak values with a predetermined critical value if the period of time of reporting the CCA has started; and
   an establishing unit which establishes the channel status as according to a result of the comparing unit,
   wherein the period of time of reporting the CCA repeats every 18 OFDM symbols, and corresponds to a period of time of at least one OFDM symbol for reporting the channel status to the MAC.

13. The CCA apparatus of claim 12, wherein each of the two moving-average windows has an identical period of time, and the period of time is established according to a time frequency code (TFC).

14. The CCA apparatus of claim 12, wherein the OFDM system corresponds to a multi-band OFDM system using a multi-band including three frequency bands for each channel.

15. The CCA apparatus of claim 12, wherein the predetermined critical value is less than a maximum of the number of a counted peak values, and is established according to a time frequency code (TFC).

16. The CCA apparatus of claim 12, wherein the reporting unit reports, to the MAC, that the channel status is busy if the number of the counted peak values is greater than the predetermined critical value.

17. The CCA apparatus of claim 12, wherein the reporting unit reports, to the MAC, that the channel status is not busy if the number of the counted peak values is less than or equal to the predetermined critical value.

18. The CCA apparatus of claim 12, wherein the two moving-average windows are applied to any one of a plurality of frequency bands if the plurality of frequency bands is used for each channel.

19. The CCA apparatus of claim 12, wherein a period of time of each of the moving-average windows is equivalent to a period of time of at least one OFDM symbol unit for frequency hopping if a plurality of frequency bands is used for each channel.

20. The CCA apparatus of claim 12, wherein a period of time of the moving-average windows is equivalent to a period of time of 64 sample units if a single frequency band is used for each channel.

* * * * *